United States Patent
Miura et al.

[11] 3,869,474
[45] Mar. 4, 1975

[54] 3,4-DIHYDROXY-BENZYLALCOHOL AMINO DERIVATIVES

[75] Inventors: Yuji Miura, Kawaguchi; Taku Nagao, Warabi; Masanori Sato, Toda; Hiromichi Nakajima, Yono; Masazumi Kawanishi, Tokyo-to, all of Japan

[73] Assignee: Tanabe Seiyaku Co., Ltd., Osaka, Japan

[22] Filed: July 22, 1971

[21] Appl. No.: 165,374

[30] Foreign Application Priority Data
Aug. 7, 1970    Japan.............................. 45-69536

[52] U.S. Cl..... 260/343.7, 260/501.11, 260/501.19, 260/566 F, 260/570.5 C, 260/570.6, 260/570.8 R, 260/999
[51] Int. Cl............................................ C07c 91/16
[58] Field of Search......... 260/570.6, 501.1, 501.11, 260/343.7, 501.19, 501.18

[56] References Cited
UNITED STATES PATENTS

| | | | |
|---|---|---|---|
| 2,900,415 | 8/1958 | Biel................................ | 260/570.6 |
| 3,135,797 | 6/1964 | Biel................................ | 260/570.6 |
| 3,312,733 | 4/1967 | Howe............................. | 260/501.18 |
| 3,341,593 | 9/1967 | Zeile et al...................... | 260/570.6 |

OTHER PUBLICATIONS
Baltzly et al., "Journal Medicinal Chemistry," Vol. 11, pages 833–844 (1968) page 834 relied on.
Walker et al., "Journal Medicinal Chemistry," Vol. 9, pages 624–630 (1966).

*Primary Examiner*—Robert V. Hines
*Attorney, Agent, or Firm*—Bierman & Bierman

[57] ABSTRACT

A 3,4-dibenzyloxyphenyl-glyoxal is condensed with 3,4,5-trimethoxyphenethylamine compound of the formula:

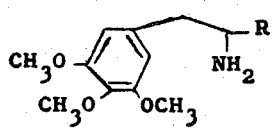

wherein R is hydrogen or methyl. The resultant intermediate product is subjected to catalytic hydrogenation. 3,4-dihydroxy-benzylalcohol compounds of the formula:

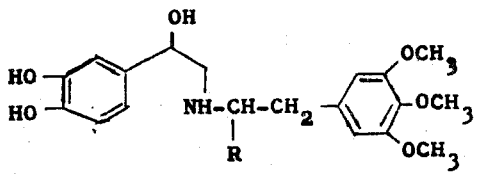

wherein R is as defined above, are produced. These compounds exhibit potent cardiotonic activity. Bronchodilating and vasodilating activity of these compounds are considerably low. Pharmaceutically acceptable acid addition salts of these compounds are also within the scope of the invention.

2 Claims, No Drawings

3,4-DIHYDROXY-BENZYLALCOHOL AMINO DERIVATIVES

This invention relates to novel 3,4-dihydroxy-benzylalcohol derivatives and a process for preparing same. More particularly, it relates to the derivatives represented by the formula:

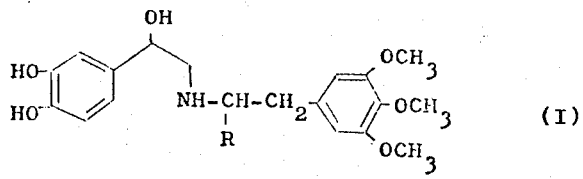

wherein R is hydrogen atom or methyl radical, and a pharmaceutically acceptable acid addition salt thereof.

The 3,4-dihydroxy-benzylalcohol derivatives (I) of the present invention are useful as cardiotonic agents. The derivatives (I) show potent adrenergic $\beta_1$-stimulating activity. In particular, said activity of the derivatives (I) are characterized by the high ratio of increase of cardiac contractile force as compared with the heart rate. The adrenergic $\beta_2$-stimulating activity (i.e., bronchodilating and vasodilating activity) of the derivatives (I) are considerably low.

According to the present invention, the 3,4-dihydroxy-benzylalcohol derivatives (I) can be prepared by condensing 3,4-dibenzyloxyphenyl-glyoxal (II) with 3,4,5-trimethoxyphenethylamine compounds of the formula:

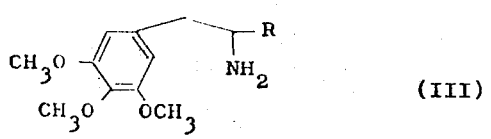

wherein R has the same meaning as defined above, and subjecting the resultant product to catalytic hydrogenation.

The condensation reaction of the invention can be accomplished by mixing the compounds (II) and (III) in the presence of a catalyst in a hydrogen atmosphere. Preferred examples of the catalyst include palladium carbon, palladium dioxide, platinum and platinum dioxide. Methanol, ethanol and dioxane are suitable as the reaction solvent. It is preferred to carry out the reaction at 15° to 50°C, especially at room temperature. The 3,4-dihydroxy-acetophenone compounds represented by the formula:

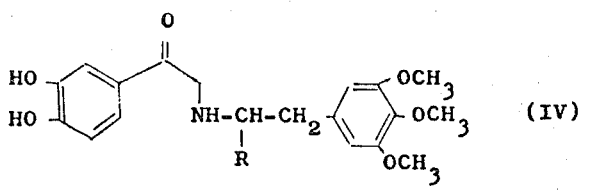

wherein R has the same meaning as defined above, are obtained as the product.

Alternatively, the condensation reaction of the invention may be performed by mixing the compounds (II) and (III) in the presence of a reducing agent. Preferred examples of the reducing agent include an alkali metal borohydride (e.g., lithium borohydride, potassium borohydride, sodium borohydride), an alkali metal aluminium hydride (e.g., lithium aluminium hydride) and sodium amalgam. The solvent employed in the aforementioned reaction are also employed as the reaction solvent. It is preferred to carry out the reaction at 5° to 70°C. In the latter case, the 3,4-dibenzyloxy-benzylalcohol compounds represented by the formula:

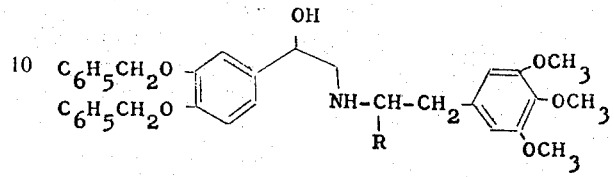

wherein R has the same meaning as defined above, are obtained as the product.

The compounds (IV) or (V) thus obtained may be isolated from the reaction solution by conventional manner. From a practical viewpoint, however, it is convenient to recover them in the form of an acid addition salt (e.g., hydrochloride, sulfate, oxalate). The free base of the compounds (IV) or (V) as well as the acid addition salt thereof can be employed in the subsequent hydrogenation procedure.

The catalytic hydrogenation of the compounds (IV) or (V) may be carried out in the presence of a catalyst and in a hydrogen atmosphere. Preferred examples of the catalyst are platinum dioxide, platinum and palladium-carbon. For the hydrogenation of the compound (IV), nickel and cobalt may also be employed as the catalyst. Methanol, aqueous methanol, isopropanol and water are suitable as the reaction solvent. It is preferred to carry out the reaction at 10° to 30°C, especially at room temperature.

The 3,4-dihydroxy-benzylalcohol derivatives (I) of the present invention can be used for pharmaceutical use either as the free base or a salt thereof. The base and salt thereof are readily convertible from one to the other by conventional manner. Therapeutically acceptable salts are, for example, hydrochloride, hydrobromide, perchloride, nitrate, sulfate, phosphate, formate, acetate, propionate, glycollate, lactate, pyruvate, oxalate, malonate, succinate, maleate, fumarate, malate, citrate, tartarate, ascorbate, hydroxymaleate, phenylacetate, aminobenzoate, methanesulfonate, ethanesulfonate, benzenesulfonate, p-toluenesulfonate, sulfanilate, aspartate or glutamate. The 3,4-dihydroxy-benzylalcohol derivatives (I) may be used in pharmaceutical preparations in conjunction or admixture with a pharmaceutical excipient that is suitable for enteral or parenteral administration. The excipient selected should be one that does not react with the 3,4-dihydroxy-benzylalcohol derivatives (I). Suitable excipients include, for example, gelatin, lactose, glucose, sodium chloride, starch, magnesium stearate, talcum, vegetable oil, benzyl alcohol and gums. Other known medicinal excipients may be employed. The pharmaceutical preparation may be a solid dosage form such as a tablet, a coated tablet, a pill or a capsule, or a liquid dosage form such as a solution, a suspension or an emulsion. The pharmaceutical preparation may be sterilized and/or may contain auxiliaries, such as preserving, stabilizing, wetting or emulsifying agents. The pharmaceutically preparation may also contain other therapeutically valuable substances.

Practical and presently preferred embodiments of the present invention are illustratively shown in the following examples.

Example 1

1.8 g of 3,4-dibenzyloxyphenyl-glyoxal and 1 g of 3,4,5-trimethoxyphenethylamine are dissolved in a mixture of 30 ml of ethanol and 20 ml of dioxane, and 0.4 g of 10 percent palladium-carbon is added to the solution. The mixture is subjected to catalytic hydrogenation for 6 hours in a hydrogen atmosphere at room temperature and at atmospheric pressure. After the reaction is completed, the mixture is filtered to remove the catalyst. The filtrate is acidified with hydrochloric acid. Then, the solution is evaporated under reduced pressure to remove solvent. The residue thus obtained is recrystallized from ethanol. 1 g of α-(3,4,5-trimethoxyphenethylamino)-3,4-dihydroxy-acetophenone hydrochloride is obtained. Yield: 53 percent M.p. 220°C (decomp.)

2 g of the product are dissolved in 100 ml of methanol, and 0.2 g of platinum dioxide is added to the solution. The mixture is subjected to catalytic hydrogenation for 5 hours in a hydrogen atmosphere at room temperature and at atmospheric pressure. After the reaction is completed, the mixture is filtered to remove the catalyst. The filtrate is concentrated to dryness. The residue thus obtained is recrystallized from ethanol. 1.6 g of α-(3,4,5-trimethoxyphenethylaminomethyl)-3,4-dihydroxybenzylalcohol hydrochloride are obtained as colorless prisms. Yield: 79.5 percent M.p. 193°C (decomp.)

Example 2

3.2 g of 3,4-dibenzyloxyphenethyl-glyoxal and 2.0 g of α-methyl-3,4,5-trimethoxyphenethylamine are dissolved in a mixture of 40 ml of ethanol and 40 ml of dioxane, and 0.6 g of 10 percent palladium-carbon is added to the solution. The mixture is subjected to catalytic hydrogenation for 6 hours in a hydrogen atmosphere at room temperature and at atmospheric pressure. After the reaction is completed, the mixture is filtered to remove the catalyst. 1.5 g of anhydrous oxalic acid are added to the filtrate. Then, the solution is evaporated to remove solvent. The residue thus obtained is recrystallized from methanol. 1.6 g of α-(α-methyl-3,4,5-trimethoxyphenethylamino)-3,4-dihydroxy-acetophenone ½ oxalate are obtained as colorless needles. Yield: 42.8 percent M.p. 195° – 196°C (decomp.)

1.3 g of the product are dissolved in 150 ml of methanol, and 50 mg of platinum dioxide is added to the solution. The mixture is subjected to catalytic hydrogenation for 2.5 hours in a hydrogen atmosphere at room temperature and at atmospheric pressure. After the reaction is completed, the mixture is filtered to remove the catalyst. The filtrate is concentrated to dryness. The residue thus obtained is recrystallized from 90 percent aqueous ethanol. 0.7 g of α-(α-methyl-3,4,5-trimethoxyphenethyl-aminomethyl)-3,4-dihydroxybenzylalcohol ½ oxalate is obtained as colorless needles. Yield: 53.6 percent M.p. 174°C (decomp.)

Example 3

12.2 g of 3,4-dibenzyloxyphenyl-glyoxal and 7.1 g of 3,4,5-trimethoxyphenethylamine are dissolved in a mixture of 120 ml of ethanol and 120 ml of dioxane. 1.5 g of sodium borohydride are added gradually to the solution under stirring and ice-cooling. Then, the mixture is stirred for an hour at room temperature and for 30 minutes under heating. The reaction mixture is evaporated to remove solvent. The residue thus obtained is dissolved in water. The aqueous solution is extracted with ether. The ether extract is washed with water and dried. Dry hydrogen chloride gas is introduced into the extract, and the precipitated crystals are collected by filtration. The crystals are recrystallized from a mixture of ethanol and ether. 11.5 g of α-(3,4,5-trimethoxyphenethylaminomethyl)-3,4-dibenzyloxybenzylalcohol hydrochloride are obtained as colorless needles. Yield: 59.5 percent M.p. 145°C.

11.5 g of the product is suspended into a mixture of 200 ml of isopropanol and 70 ml of water, and 1 g of 10 percent palladium-carbon is added to the solution. The suspension is subjected to catalytic hydrogenation for 3 hours in a hydrogen atmosphere at room temperature and at atmospheric pressure. After the reaction is completed, the suspension is filtered to remove the catalyst. The filtrate is concentrated to dryness. The residue thus obtained is recrystallized from 90 percent aqueous isopropanol. 7.32 g of α-(3,4,5-trimethoxyphenethylaminomethyl)-3,4-dihydroxybenzylalcohol are obtained as colorless prisms. Yield: 92 percent M.p. 193°C.

What we claim is:

1. A compound of the formula:

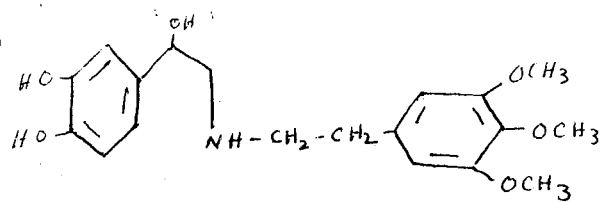

or a pharmaceutically acceptable acid addition salt thereof.

2. The compound as claimed in claim 1 wherein the acid salt is a hydrochloride, hydrobromide, perchloride, nitrate, sulfate, phosphate, formate, acetate, propionate, glycollate, lactate, pyruvate, oxalate, malonate, succinate, maleate, fumarate, malate, citrate, tartarate, ascorbate, hydroxy-maleate, phenylacetate, aminobenzoate, methanesulfonate, ethanesulfonate, benzonesulfonate, p-toluenesulfonate, sulfanilate, asparate or glutamate.

* * * * *